Jan. 24, 1967 W. GOULD ETAL 3,299,766
SEALING ELEMENT FOR FASTENER DEVICES
Original Filed Dec. 23, 1959 2 Sheets-Sheet 1

INVENTORS
WILLIAM GOULD
BY CHARNA GOULD

Darby & Darby
ATTORNEYS

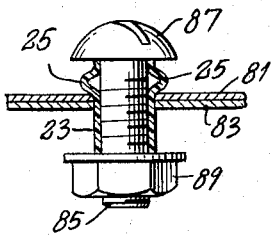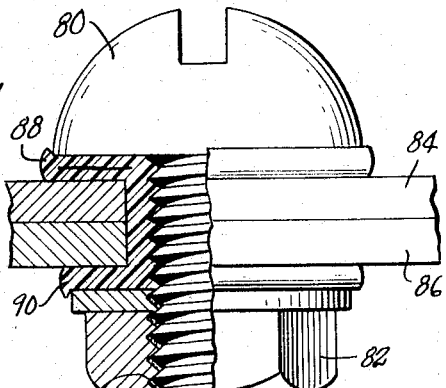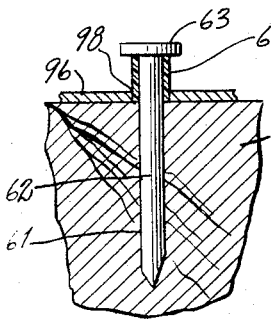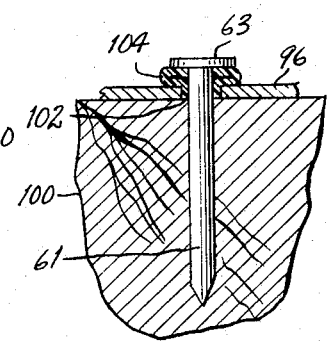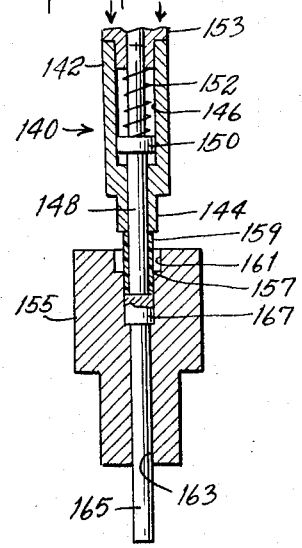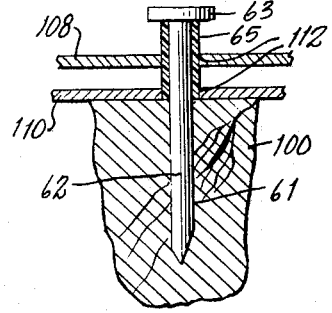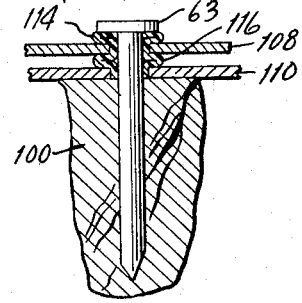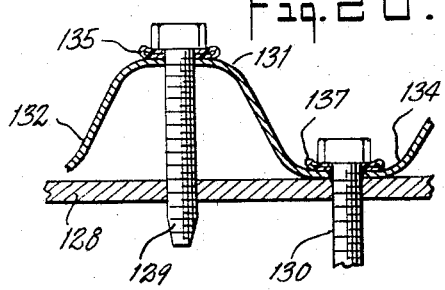

United States Patent Office

3,299,766
Patented Jan. 24, 1967

3,299,766
SEALING ELEMENT FOR FASTENER DEVICES
William Gould and Charna Gould, both of
93 Sagamore Road, Millburn, N.J. 07041
Continuation of application Ser. No. 861,497, Dec. 23, 1959. This application Apr. 30, 1964, Ser. No. 365,560
12 Claims. (Cl. 85—1)

This is a continuation of application Serial No. 861,-497, filed December 23, 1959, now abandoned, which was in turn a continuation-in-part of application Serial No. 389,950, filed November 3, 1953, now abandoned; application Serial No. 400,492, filed December 28, 1953, now abandoned; application Serial No. 400,493, filed December 28, 1953, now abandoned; application Serial No. 416,-896, filed March 17, 1954, now abandoned; application Serial No. 416,897, filed March 17, 1954, now abandoned; and application Serial No. 416,898, filed March 17, 1954, now abandoned.

This invention relates to fastener assemblies and more particularly to a sealing piece or element for use with fasteners such as screws, rivets, nails, studs, bolts, nuts, or the like for providing fastener assemblies which are so held that they will not be loosened by vibration or changes in temperature and pressure, and provide leakproof and corrosion-resistant seals between the fastener and the structure being fastened.

There has been for great many years an increasingly persistent demand for a sealing device for use with a fastener which would provide a vibration-proof, leakproof, and corrosion-resistant assembly useful over a wide range of temperatures and pressures, which is efficient and durable in use, able to compensate for variations in mass-produced fasteners, and yet at the same time be sufficiently inexpensive to be economically feasible for commercial manufacture, sale and use in and with mass-produced articles.

There have been many widely different types of such sealing devices heretofore proposed and the art is replete with all manner of fasteners, sealing devices, washers, sleeves, etc., designed for these specific purposes. Some are used quite extensively. Nevertheless, notwithstanding the many and various sealing devices heretofore proposed there has not as yet been one which succeeds in all respects in filling the long recognized need.

Some of the many qualities that an ideal sealing device for a fastener should possess are enumerated below.

(1) *Sealing effect.*—A fundamental requirement is that, when the fastener is tightened, the sealing device must conform to whatever space there is between the fastener and the article being fastened. Hence, the sealing device must fit snugly to the fastener body or shank as well as maintain snug engagement with the surface of the article which is to be fastened, and maintain this seal all during use even during temperature and pressure fluctuations. It would be of great advantage if the fastener could be removed and replaced and the seal maintained. A sealing device which lacks this property is unsatisfactory as a seal. This is of utmost importance in the construction field for preventing leaks.

(2) *Inherent rigidity.*—The sealing device should have adequate inherent rigidity to insure that it is not displaced sideways or squeezed out when the fastener is tightened in use. For example, elastic rubber washers of soft rubber, elastomers or dipped plastics seal well by conforming to various surfaces. However, these materials have little inherent rigidity which is not sufficient to prevent the material from being squeezed out when the fastener is tightened, requiring special provisions to prevent this displacement of elastic material during the tightening of the fastening means, such as by corresponding annular recesses placed on the under side of the head of the fastener or in the fastener wall, such as nuts, and bolts to avoid lateral deviation.

(3) *Inherent resiliency or elasticity.*—The sealing device must have sufficient inherent resiliency so that after the fastener is tightened the seal retains some elasticity for providing a continuous seal over long periods of time. Sealing devices of metal which have little or no resiliency have the disadvantage that if the fastener is loosened unintentionally such as due to temperature fluctuations, or if the fastener is temporarily removed, the seal is broken and becomes ineffective to prevent leakage when the fastener is reassembled. This is of special importance, if the sealing device is used with relatively high pressure for even short periods of time or where vibration is involved. Further the inherent resiliency of the sealing device is needed to aid in locking the fastening means in place against inadvertent release.

(4) *Ease of use.*—It is of course essential that any device to be used in or with a mass-produced article must be readily and quickly usable in a wide variety of forms without requiring any special fixtures or tools. For maximum usefulness the sealing device should be clean to use and have a simple, smooth shape for ease in handling and applying it on the fasteners or placing it in the fastener opening. Also, the same sealing device should be adapted for use on various types of conventional fasteners such as screws, rivets, bolts, nuts, nails, etc. to provide for interchangeability and thus reduce inventory.

(5) *Self-conforming to overcome any variations of fasteners and their engagement holes.*—Since fasteners are mass-produced and are not normally individually inspected, variations in threads, outer diameters of shanks, and smoothness of heads are common. Similarly the fastener openings also normally vary somewhat in size and shape. For a sealing device to be effective it should be able to adapt to these variations and yet provide a positive seal in use. This characteristic is related to resiliency discussed above.

(6) *Inexpensiveness and lightness of weight.*—To provide an ideal fastener seal the sealing device must be relatively inexpensive and be preferably light in weight in order to provide for savings in transportation, storage, etc. and to meet the stringent requirements of weight in use in missiles, rockets, aeroplanes, trucks or other situations where weight is important.

Since in many of these applications the items to be fastened are thin sheets made of light metal alloys which are relatively soft and easily damaged, the work required to deform the sealing device to conform to the opening should not be too large.

(7) *Durability.*—To be commercially acceptable in the trade, it is desirable that a sealing device of this kind have as high a degree of inherent durability as is possible. The durability of many metals is entirely destroyed by rusting or corrosion even without extensive use. This deterioration of the metal fastener is hastened if it is used in certain atmospheres or in contact with certain materials. It should have sufficient tensile strength so as not to chip or disintegrate easily. Also, the fastener should be protected from electrolytic action when dissimilar metals are in contact, such as a steel fastener used within aluminum. It is important to avoid these difficulties insofar as possible by provision of a sealing device which insulates the fastener from the engagement material and which is free from corrosion of almost all known mediums or materials and yet is capable of withstanding the greatest possible amount of wear and is not subject to deterioration in storage.

(8) *Appearance.*—Notwithstanding the more important qualities listed above, it is essential that where a sealing device is used in mass-produced items, especially those for the consumer, a fastener assembly be provided that is clean, matches the color of engagement material, is attractive to the eye and prevents squeaks and chatter not only at the time of purchase but even after a long extended period of use. The seal should protect highly finished porcelain or ceramic surfaced materials or similar brittle finishes such as vitreous enamel building panels, signs, etc. from cracking, chipping or crazing and not mark, mar or otherwise mutilate the sealing surface during application or use.

While the above are probably the most important characteristics of an ideal sealing device the list is not intended to be exhaustive, since the sealing device should also be free from objectionable odors, free from any tendency to deteriorate prior to use such as while in storage, and not require any special apparatus for maintaining the sealing relationship.

It is important to note that all of the foregoing points of desirability which a sealing device for use with a fastener should have are all entirely obvious and have in every case been individually recognized for a great many years. Notwithstanding this, the prior art has failed to provide a sealing device in which all of these desirable qualities are simultaneously achieved. On the contrary, these qualities have heretofore shown themselves to be to a large extent mutually antagonistic, with the result that prior art sealing devices which have fit snugly on the fastener and snugly engage the items to be fastened lack the inherent rigidity to prevent being displaced laterally when the fastener is tightened, without use of annular rings and supports. Further, those sealing devices that have inherent rigidity, such as certain metals, lack resiliency to provide a vibration-proof seal and are not able to retain a tight seal over wide ranges of temperature and pressure, and require special shapes and forms of fastener device to apply them. Also, many seal constructions rely solely on a press fit for maintaining a seal and when the seal loses its elasticity the seal is impaired if not destroyed.

Thus, where either natural or synthetic rubber, conventionally called elastomers, is used as a resilient sealing member, the elastomer in time will take a set or lose its resiliency at least to the extent that the seals soon become ineffective to prevent leakage of fluid. Also, when subjected to mechanical pressures and heat, a rubber or elastomer sealing element loses its sealing effectiveness at an accelerated rate. In attempting to overcome these problems, the art resorted to mechanical means such as springs, fingers, sleeves and the like for forcing and maintaining the sealing element into contact with the sealing surface in an attempt to keep the seal tight.

The sealing devices of the present invention which are generally of the washer type are advantageously in the form of a relatively thin, self supporting sleeve or tube made of a rigid thermoplastic material used in conjunction with a bolt, nut, rivet, screw, nail, or other type of fastener and which is caused to be extruded and cold molded in place during fastening to form a custom fitted washer or seal which precisely conforms to the surfaces of the fastener and piece to be fastened in the minutest detail.

In accordance with the present invention, a permanently shaped, resilient washer or seal is provided to coact with any commercial fastening means. A separate, unitary, self supporting jacket or sleeve formed of a rigid, distortable thermoplastic material having sufficient rigidity, such as described below, coacts with a fastening element and when this fastening element is tightened on the item to be fastened in a conventional manner, the jacket or sleeve is extruded and cold molded beyond its elastic limit, so that a permanently shaped, but resilient, washer seal is formed. The washer or seal may be formed between the head of the fastening element and the piece of work that is to be fastened or between the nut and the piece of work to be fastened, in spaced apart relation or along the shank of a fastener and the piece to be fastened, such as to insulate the fastener from the piece. The present invention is of special advantage for use where the hole or holes through which the fastener is passed are larger than the diameter of the shank of the fastener.

Heretofore the cold-flow properties of synthetic plastic materials have been considered to be a defect and a weakness in the sealing art. Flat washers made of plastic, both rigid and elastomeric, have been used with limited success. The washer, having some resiliency, conforms to minor irregularities of surface for providing a tight initial seal when the fastener is tightened. The "flowing" of the material due to its resiliency to seal minor irregularities is not a permanent cold-flow of the material. Unless the washer is enclosed or backed with metal, with the passage of time the fastener compressive pressure causes the washer to cold-flow outwardly, thereby loosening the seal, which becomes ineffective as a seal for retaining any pressure or liquid. According to the present invention, advantage is taken of the cold-flow and other properties of nylon by confining, limiting and directing the plastic deformation to which the nylon tubes or sleeves are subjected, so that the nylon is compressed beyond its elastic limit or plastic memory and extruded to a controlled cold-flowed state to a considerable but yet limited extent, advantageously with an accordion-like configuration for filling all spaces and conforming to all imperfections. This regulated and controlled cold-flow of the sealing piece permanently changes its shape and produces a custom fitted washer or seal which is elastic and resilient and has unique and distinctive properties in its final permanent shape as formed and clamped between the fastening means and the object that is to be fastened, for providing a water-tight seal, continuously maintained under the most rugged outdoor conditions, both winter and summer, under high pressures and severe vibration.

The custom fitted washer produced provides a locking effect on the fastener which restrains removal of the fastener. This locking effect is especially effective with threaded fastening devices, and resists relative angular displacement about the thread axis. The nature of the washer provided has good frictional properties with little, if any, abrasive properties, so that no undue wear of the threads of the mating devices occurs. This locking effect remains effective even after a number of forcible separations and rematings of the elements.

It is accordingly an object of the present invention to provide a self supporting sealing device, such as a sleeve or washer, in association with a fastener, having a snug engagement with the shank of the fastener upon tightening the fastener, without lateral displacement and yet retaining sufficient resiliency for maintaining a tight seal for long periods of time, ordinarily for the life of the product.

A further object of the present invention is to provide a rigid, self-supporting, sealing device for use with fastening devices having screw threads or grooves or knurling thereon for forming a resilient sealing washer at the threaded, grooved or knurled portion of the fastening device which, during the tightening of the fastening device provides a controlled permanent deformation of the sealing device, which penetrates in between the threads, grooves or knurling of the fastening device and flow between the head of the fastening device and the object to which it is being fastened for forming a vibration resistant, fluid tight washer and seal.

Another object of the present invention is to provide a custom fitted seal for a threaded fastening device which will lock the threads in position during use without distortion and without mutilation of the mating threads.

Still another object of the present invention is to provide a sealing and locking device for use with a conventional fastener, which device is permanently deformed during the tightening of the fastener, which deformation is concentrated toward the central portion or shank of the fastener for producing a tight hermetic seal around the fastener capable of withstanding high pressures and severe vibration without becoming loose.

A still further object of the present invention is to provide a rigid extruded or molded plastic sealing device for use with conventional fastening devices and which is plastically deformable at room temperature and which attains its permanent final shape in a cold molding process in situ which provides a seal and lock with a relatively high linear resiliency.

Another object of the present invention is to provide a rigid, sealing device for use with a conventional fastening device and which is deformable in its cold state upon tightening of the fastening device so that the material of the sealing device is brought into tight and intimate contact with the fastening device and caused to flow into any space available between the fastening device and the opening for providing an hermetic seal, which is elastic, between the fastening device and the piece being fastened and which seal conforms precisely to the configuration of the fastening device and mating surface of the opening.

Still another object of the present invention is to provide an extruded or molded plastic sealing sleeve which may be of different sizes and lengths adapted to be used with a wide variety of fastening devices and having a double thickness flange at one end intended to be placed adjacent and under the fastener head for providing a controlled inwardly directed flow of material during the tightening of the fastening devices so that the completed seal hugs and locks the fastening device in sealing position.

Still another object of the present invention is to provide a self supporting, extruded or molded sleeve of nylon material surrounding the shank of a fastening device adjacent its head for forming an hermetic seal between the head of the fastening device and the piece to which it is being fastened upon the tightening of the fastening device, and which seal is capable of absorbing vibration and reducing metal fatigue and preventing corrosion due to electrolytic action.

Yet another object of the present invention is to provide an extruded or molded, cold-moldable sealing device placed about the shank of a fastener adjacent the head of the fastener for providing a locking, fluid tight seal in the course of securing together thin sheeting or other layers of material.

A still further object of the present invention is to provide a sealing device slidably disposed about the shank of a fastener and which has a rolled-over inwardly directed flange for forming a double-thickness edge, which edge is intended to be placed adjacent and under the head of the fastening means for providing a controlled inward, non-elastic flow of material towards the shank of the fastener for forming a fluid tight, vibration proof seal.

A further object of the present invention is to provide a sealing device for mounting on fasteners which accomplishes all of the above and yet is durable and easy to use, light in weight, resistant to corrosion of most fluids, requires no precautions or special tools for storage or in use, is inexpensive to make and use and provides a neat appearance in final use.

In the following description "rigid plastic" refers to those plastic materials which have sufficient toughness and cohesiveness to require a substantial force to deform and which show only an insubstantial distortion and deformation under the stress of normal usage. This definition excludes elastomers or coatings formed by a dipping process. The material of the sleeves or small tubes of the sealing devices of the present invention is a rigid thermoplastic material, such as for example, a tough polyamide, which can be deformed in its cold state when the fastening means is tightened. A tough polyamide (such as nylon, produced and sold under the tradename FM–10001 by E. I. DuPont de Nemours & Co. is advantageously used. The physical characteristics of this material are described in a publication titled "Du Pont Nylon, Molding Powder," copyrighted 1952 by E. I. du Pont de Nemours & Co. which lists on page 12 the physical characteristics of such nylon material that is useful in the present invention. These physical characteristics are:

Tensile strength —73° F., lbs./p.s.i. _____ 10,000
Elongation —73° F., percent _____ 90
Modulus of elasticity —73° F., lbs./p.s.i. _____ 400,000
Sheer strength, lbs./p.s.i. _____ 96,000
Stiffness —73° F., lbs./p.s.i. _____ 250,000
Flexural strength —73° F., lbs./p.s.i. _____ 13,800
Compressive stress at 1% deformation, lbs./p.s.i. 4,900
Deformation under load of 2,000 lbs./p.s.i. at 122°
  F., percent _____ 1.4
Heat distortion temperature under 264 lbs./p.s.i.
  ° F. _____ 150
Water absorption, percent _____ 1.5
Compression ratio _____ —2.1

Other plastic materials having similar cold flow and elasticity characteristics after being deformed at room temperatures or "cold" may be used in a similar manner. After compression beyond its elastic limit, this material does not return to its original form upon removal or cessation of the compressive pressure. Use is made of such rigid plastic material which endures cold deformation beyond its elastic limit and remains resilient, and since this deformation is regulated and controlled there is thereby produced a deformed plastic sealing device which is still elastic and which is particularly valuable for providing a resilient, yieldable and fluid tight seal. In this specification and in the claims wherever plastic nylon, or nylon FM–10001 is mentioned, it means a rigid plastic material having physical characteristics essentially similar to those listed above with respect to nylon FM–10001. Other plastics capable of being cold molded and retaining elasticity may be used, such as, for example, a polychlorotrifluorethylene plastic sold under the trade- name "Kel-F" of M. W. Kellogg Co.

The present invention will be further described in connection with the accompanying drawings which illustrate certain embodiments in which:

FIGURE 13 is an elevation sectional view of the combination of a bolt and a sleeve similar in nature to that shown in FIGURE 12 with two thin sheets to be fastened before tightening of the nut;

FIGURE 14 is a view similar to FIGURE 13 showing the bolt having a sealing sleeve thereon similar to that shown in FIGURE 2;

FIGURE 15 is an enlarged elevation view, partly in section, similar to that shown in FIGURES 13 and 14, after the nut has been tightened on the bolt to cause the sealing sleeve to undergo cold molding and showing the sleeve material forced around the threads of the bolt;

FIGURE 16 shows an elevation cross sectional view of the nail and sleeve of FIGURE 11 ready to fasten a layer of sheet material to a beam or other structure;

FIGURE 17 shows the structure of FIGURE 16 with the nail driven in place;

FIGURE 18 shows an elevation cross sectional view of two spaced plates ready to be secured to a beam or other structure by the fastener of FIGURE 11;

FIGURE 19 shows the structure of FIGURE 18 secured together;

Figure 6:
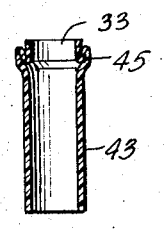
FIGURE 6 shows an elevational cross sectional view of a modified sealing sleeve having a single compressed corrugation thereof.

FIGURE 20 shows a sectional elevational view of a valley and crown of a corrugated strip secured in position by means of bolt and sleeve assemblies, in accordance with the present invention; and FIGURE 21 shows an elevational view partly in section of a die assembly for forming the sealing piece of FIGURE 6, with a rigid thermoplastic tube therein, prior to the longitudinal compression and plastic deformation of a portion of the tube for forming the sealing piece.

Referring to the embodiments of the invention, FIGURES 1 to 8 show various forms which the sealing piece of the present invention may assume, while FIGURES 9 to 20 show representative ones of these sealing piece in combination with various fastener devices and used in various ways to form sealed fastenings according to the invention, and FIGURE 21 shows a method of forming one embodiment of the sealing piece of the present invention.

Figure 1:
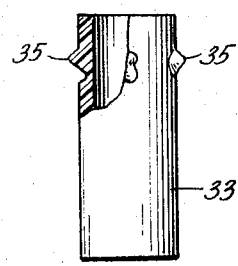
FIGURE 1 shows an elevational, cross sectional view of a uniform sleeve of a rigid plastic made in accordance with the present invention.

FIGURE 1 shows a simple form of a sealing piece, shaped as a thin-walled tubular element or sleeve 21. Sleeve 21 is self supporting and is advantageously formed by molding or extrusion of a rigid plastic material. Advantageously in use, as described more in detail below, it is slipped around or on a fastening device, such as a nail, screw, bolt, nut, rivet, stud or the like, before applying the fastener device to the items to be fastened. Illustratively, sleeve 21 may be approximately 1 inch in length, having a wall thickness preferably between .010 and .035 inch (desirably approximately .025 inch) and an outside diameter of preferably from ⅛ to ½ inch (preferably 0.228 inch).

Figure 2:
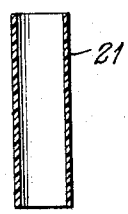
FIGURE 2 shows an elevational cross sectional view of another embodiment of the invention in the form of a tubular sleeve having an open corrugation adjacent one end thereof.

FIGURE 2 shows a modified form of sealing sleeve 23 having an outwardly extending open type corrugation 25 formed adjacent one end thereof, constituting an outer flange or shoulder. Corrugation 25 is spaced from the upper end of sleeve 23 so that sleeve 23 may be properly positioned in a fastener hole and adequate double thickness of material is provided above the fastener hole or recess for forming a washer integral with the fastening, as described below. The corrugation may be positioned at any suitable distance adjacent the end, including at the very end itself.

Figure 3:
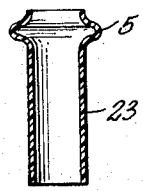
FIGURE 3 shows an elevational cross sectional view of another embodiment of the invention in the form of a tubular sleeve similar to that shown in FIGURE 2 but having two corrugations at one end thereof.

FIGURE 3 shows a tube 27 similar to sleeve 23 but having a pair of open outwardly extending corrugations 29 and 31 at or near one end thereof. While two corrugations are shown, more may be used where desired.

Figure 4:
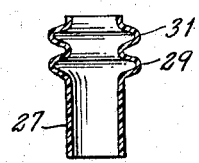
FIGURE 4 shows an elevational view partly in section of an embodiment of the invention in the form of a sealing sleeve having outward projections adjacent one end thereof.

FIGURE 4 shows a further modification where a thin walled sleeve 33 has a plurality of outwardly directed spaced apart projections 35 thereon adjacent the upper end and extending annularly around sleeve 33. As described below, these projections are positioned on sleeve 33 in a suitable position to determine the location of the sleeve 33 relative to the fastened elements.

Figure 5:
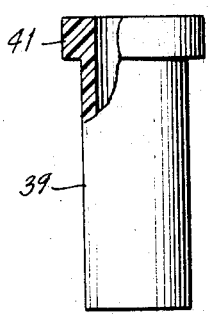
FIGURE 5 shows an elevational view, partly in section, of a modified sleeve having a shoulder at one end thereof, magnified.

FIGURE 5 shows a further modification of the sealing piece of the invention, here in the form of a tube or sleeve 39 provided with an outwardly extending shoulder or boss 41 at one end, which also helps in positioning the sealing piece in use, as described below. Shoulder 41 is shown greatly enlarged, but should not exceed .035 inch in thickness.

FIGURE 6 shows still another embodiment, in the form of a tube or sleeve 43 having a compressed or overlapped corrugation 45 adjacent one end which properly positions sleeve 43. It will be understood that a plurality of such corrugations may be used where desired.

Figure 7:
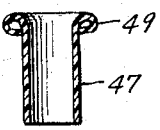
FIGURE 7 is a cross sectional elevational view of a further embodiment of the invention in the form of a sleeve having an outwardly rolled-over double thickness edge adjacent one end thereof.

FIGURE 7 shows a further embodiment in which a sleeve 47 has a rolled over inwardly turned upper flange or washer portion 49 at one end. The flange is double thickness along a vertical axis and is preferably made by folding the tubing back over itself so that the original upper edge appears along the inner circumference of the flange, abutting the outer surface of the sleeve 47, with the fold constituting an outer rim of the flange 49. Flange portion 49 is illustratively shown having a space formed between the layers or thickness of the sleeve forming it; however, the double layer or thickness could be abutting.

Figure 8:
FIGURE 8 is a similar view of an embodiment of the invention similar to FIGURE 7 and having a shorter length tube.

FIGURE 8 illustrates a shorter length of the tube shown in FIGURE 7.

FIGURES 9 through 12 show various fastener devices or elements with representative ones of the sealing pieces positioned thereon. As already indicated, any of the various forms of sealing piece may be utilized with any of a variety of fastener devices, such as nails, screws, bolts, studs, nuts, rivets or the like. In each case, the sealing piece is advantageously placed on the fastener element, and has an inner diameter or bore adapted snugly to fit the cooperating shank.

Figure 9:
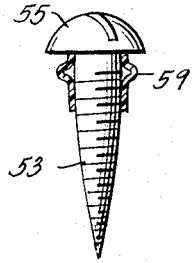
FIGURE 9 is a cross sectional view of one type of screw in combination with a sealing sleeve made in accordance with the present invention and similar to the form shown in FIGURE 2.

FIGURE 9 shows a fastener element in the form of a screw 53 having a head 55 and having on its shank a sealing piece in the form of a relatively short tube 57 with a lateral open corrugation 59 located adjacent screw head 55. The sealing piece 57 is essentially of the type illustrated in FIGURE 2. In a manner to be discussed below, corrugation 59 correctly positions screw 53 in the screw opening and limits the downward movement thereof so that a predetermined portion of sleeve 57 remains above the article to be fastened to form a washer between the article and screw head 55.

Figure 10:
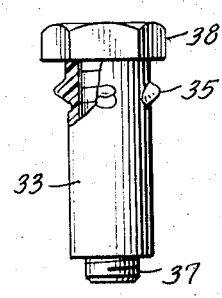
FIGURE 10 is an elevational view, partly in section, of the embodiment of the invention shown in FIGURE 4 applied to a bolt.

FIGURE 10 shows a different fastener element, in the form of a bolt 37 having thereon a sleeve 33 similar to that shown in FIGURE 4. Projections 35 serve to limit the downward movement of the bolt 37 into its recess so that a predetermined length of sleeve 33 remains above the bolt hole for forming a washer.

Figure 11:
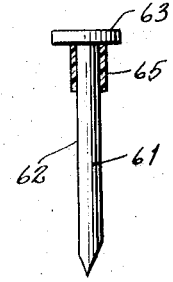
FIGURE 11 is a side elevational cross sectional view of one form of a nail in combination with a uniform plastic sleeve similar to that shown in FIGURE 1 but shorter in length.

FIGURE 11 shows a nail fastening element 61, having a cylindrical section or shank 62, which may be smooth, rough, corrugated or threaded, and having a head 63. A uniform thin walled sleeve 65, such as shown in FIGURE 1, is slidably positioned on the cylindrical portion 62 of nail 61 adjacent head 63.

Figure 12:
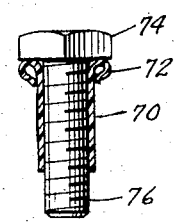
FIGURE 12 is a side elevation view of a sealing sleeve similar to that shown in FIGURE 7 applied to one form of a bolt.

FIGURE 12 shows another fastener element in the form of a bolt 76 with a sleeve 70 on its shank having a rolled over inwardly turned, double layer or thickness flange or rim 72 such as shown in FIGURES 7 or 8 adjacent bolt head 74. Advantageously sleeve 70 forms a snug fit with the threaded shank portion of bolt 76, which aids in avoiding accidental displacement prior to or during use.

It will be understood that FIGURES 9 to 12 are illustrative only, since any of the sealing pieces of FIGURES 1 to 8 may be used on any desired type of fastening element.

FIGURES 13 to 20 show illustratively how the sealing pieces, such as shown in FIGURES 1 to 8, and their cooperating fastener devices, such as shown in FIGURES 9 to 12, are applied to and used with the items to be fastened, to form a complete sealed fastening.

FIGURES 13 through 15 show how two representative forms of the sealing piece made in accordance with the present invention are utilized with a bolt fastener device to join two sheets of material. In FIGURE 13, sealing piece sleeve 70, of the type shown in FIGURE 8, is first mounted on the shank of bolt 78 having head 80, with rolled over flange 72 on sleeve 70 placed adjacent head 80 of bolt 78. Bolt 78 with sealing sleeve 70 thereon is passed through openings in plates 84 and 86 of sheet metal or other material to be joined. The lateral projection or outer rim 72 prevents the assembly from falling through, and keeps bolt head 80 spaced from the upper sheet 84. Preferably the length of sleeve or tube 70 is such as to extend for some distance below the bottom of plate 86. In this and other forms of sealing piece of the present invention, the length of the piece may be substantially greater than that of the fastening being formed, and may, for example, be twice the completed fastening length, or even more. Nut 82 is shown partially threaded on bolt 78 abutting the bottom end of sleeve 70. Upon tightening nut 82 on bolt 78, first the cylindrical portion of the sealing piece is longitudinally compressed, making its walls thicker so that they tighten inwardly upon the threads of bolts 78 and also spread outwardly to engage the inner edges of the openings in sheets 84 and 86. Also, the upper lateral projection 72 is compressed axially of the bolt. The doubled-back configuration of flange 72 causes the material to flow inwardly towards the shank of bolt 78 and to be cold molded in situ to form an integral washer portion 88 of bolt 78 between head 80 of bolt 78 and the upper surface of sheet 84 as seen in FIGURE 15. Simultaneously, the tightening of nut 82 on bolt 78 compresses the projecting lower portion of tube or sleeve 70 longitudinally, causing it to spread laterally and to form another integral washer 90 between nut 82 and the under surface of sheet 86. Upon tightening the fastener assembly 78 and 82 and compressing sleeve 70, the extruded flow of the material of sleeve 70 is concentrated towards the inner edge of rim 72 which is contiguous to the shank and thus the shank of the fastener is enveloped by the controlled flow of the material, which is cold molded to fill also the thread interstices and the space between the bolt shank and the surfaces of the hole, forming an airtight, leakproof seal, despite the corrugations of the threads, and whatever irregularities there may be in the outline of the hole and the shank of the fastener element being sealed. The outwardly rolled over, multiple layer or thickness flange 72 causes the flow of material to be concentrated toward its edges which are adjacent the shank of the fastener, and hence it flows inwardly. This controlled plastic flow produces a self conforming, heremetic seal and a locking effect, since the material is forced somewhat into the space 94 between the threads of the nut and the bolt and spread about the periphery of the threaded portion 94, thereby preventing loosening of the nut 82 on bolt 78. This locking and sealing action remains effective even if bolt 78 is repeatedly separated from and reinserted into nut 82.

In a similar manner, FIGURE 14 shows a sealing piece 23, of the form shown in FIGURE 2, mounted on a bolt 85 having a head 87. The corrugation 25 of the sealing piece holds the bolt 85 and sleeve 23 in place in the bolt holes in sheets 81 and 83 when first inserted. Nut 89 is shown partially threaded on bolt 85 and abuts the bottom of sleeve 23 extending through the bolt openings. Upon tightening nut 89 an insulating sealing sleeve is formed, as shown in FIGURE 15, in a manner similar to that described above.

While only two embodiments have been described in detail with respect to forming a seal, all of the embodiments shown in FIGURES 1 to 8 may be so used. As mentioned above,, the thin walled cylinder, shown in FIGURE 1, is advantageously suitably held or supported during tightening so that a portion thereof extends above the upper surface of the items being secured. As shown, a portion, also extends below. Upon tightening the nut on the bolt, the sleeve is compressed in an accordion-like fashion, forming a washer between the head of the fastener and the upper surface of the item being fastened, as well as a further washer between the lower surface of the item and the fastener. It will be understood that, in each of the forms of sealing piece shown in FIGURES 2 to 8, the projection near one end (such as the corrugation or corrugations of FIGURES 2, 3 and 6, the individual projections of FIGURE 4 and the flanges of FIGURES 5, 7 and 8) provides an arrangement for properly locating and positioning the sealing piece and its fastener relative to the items being joined, since the cylindrical tube portion of the sealing piece may pass through a hole in the item to be fastened, while the projection does not.

Rigid vibration tests of sealing devices made in accordance with the present invention, shown in FIGURES 7, 8, 12 and 13, demonstrated the excellent locking characteristics provided by the present invention. Sleeves of the present invention were used on threaded connections of #10–32, ¼–28, and ⅜–24 and vibrated for 50,000 cycles with no failure. In fact, the ¼–28 was vibrated for 125,000 cycles with no failure. In these same tests, identical bolts were fastened without sleeves of the present invention and there was general failure substantially below the full amount of cycles.

In sealing tests with the present invention 10–32 bolts carrying sleeves of the present invention were mounted on a test fixture and tightened. The test fixture was placed in a temperature chamber and the chamber temperature increased to +250° F. and maintained at that temperature for twenty minutes. The fixture was vibrated over a frequency range of 5 c.p.s. to 500 c.p.s. After the vibration test, pressure was applied to the fixture in increments of 1000 p.s.i.g. until 20,000 p.s.i.g. was attained. There was no evidence of any leakage during the tests.

As already described, when using the sealing piece of the invention with a bolt fastener or a rivet fastener, the sealing piece may pass through both items to be fastened. However, this is not necessarily the case, and, where desired, the sealing piece may pass through but one of the items to be fastened, or through neither of them.

Thus, when using a screw fastener, such as shown in FIGURE 9, the tubular portion 57 may pass through but one item being fastened, and may butt against the other, to provide the compressive force for extruding the sealing piece. The same may be done when using a stud or machine screw fastener. In still other cases, the sealing piece may be retained entirely between the head of the fastener and the surface of the adjacent item to be fastened with some material of the sealing piece being forced into any space between the fastener and the opening in the adjacent surface of the items being fastened through which the shank of the fastener passes.

FIGURE 16 shows one way of using the nail and sleeve combination shown in FIGURE 11 to sealably hold a plate or sheet 96, of metal or other material, to a structure 100, such as of wood or plastic material, into which nail 61 is to be driven.

Sheet 96 has a hole 98 therein which is larger than the diameter of shank portion 62 of nail 61, and is sufficiently large to receive sleeve 65 of the sealing piece. When nail 61 is driven in place, as shown in FIGURE 17, plastic sleeve 65 is caused to undergo cold plastic deformation in a somewhat accordion-like manner and to completely fill the space between shank 62 and the opening 102 in plate 96 and to form an insulating cushion-like resilient washer 104 between nail head 63 and the upper surface of plate 96. Thus, the use of the present invention forms a vibration and leakproof insulating layer between the nail and the sheet secured therewith. Resilient washer 104 serves to prevent cracking, chipping or crazing or otherwise harming the upper surface of plate 96, even if it were relatively delicate, such as a porcelain or polished surface.

In some instances, it is necessary for the hole 98 to be larger than the outer diameter of sleeve 65. In such case, sleeve 65 sits on top of plate 96, and is compressed between head 63 and plate 96 when the nail fastener is driven in. At the same time, some of the material of the sealing piece will enter any space between nail shank 62 and the surrounding plate 96 as well as tightly gripping shank 62, so as to aid in the sealing and locking action.

It will be understood that the same action as described above with a nail fastener will occur for other types of fasteners, including screws, stud bolts, machine screws, bolts, nuts, rivets or the like.

The present invention is also useful in positioning a pair of plates or the like in spaced apart relation. The sealing piece provides support for the plates and forms an effective, elastic, fluid tight locking seal, as shown in FIGURES 18 and 19, where FIGURE 18 shows the arrangement before driving the nail fastener in place, and FIGURE 19 shows the final arrangement after fastening. Two plates 108 and 110 of metal or other material are shown in spaced apart relation, having holes 112 therein somewhat larger than the diameter of shank 62 of nail 61 and sleeve 65. Upon driving the nail 63 in place into structure 100, as indicated in FIGURE 19, sleeve 65 undergoes permanent deformation in the somewhat accordion-like manner discussed above, and is cold molded in place so as to tightly fill any space between nail shank 62 and holes 112 in plates 108 and 110, respectively, as well as forming an insulating washer or buffer 114 between plates 108 and 110 and a washer 116 between nail-head 63 and the upper surface of plate 108. The washers 114 and 116 formed remain rigid and will not be displaced from under head 63 during the forming operation or application of pressure. Thus plates 108 and 110 are held separated in a vibrationproof and leakproof manner, and the respective plates are tightly secured to the backing member 100. Advantageously the plastic sleeves shown in FIGURES 11 and 16 to 19, respectively, are simple cylindrical sleeves slidably mounted on the nail, but any of the other embodiments of sealing piece disclosed herein may also be used.

The present invention provides washers integral with the seals, and which are flexible and resilient and yet having a relatively permanent final shape. They conform readily to various shapes, surfaces and contours with which the fastener is used and provide a vibrationproof, fluid-tight seal over wide temperature and pressure ranges. As indicated in the configuration of FIGURE 20, fasteners 129 and 130 using the present invention may provide seals 135 and 137, respectively, for a crown 131 of a corrugated strip 132 as well as for a valley 134 for fastening corrugated strip 132 to support 128. The initial sealing device for the crown and valley may be identical. In both situations, the sealing washer deforms at stress point so as to conform readily to both the positive and negative contours in providing an hermetic seal therewith. The material is distorted and flows the thread into interstices for providing a moistureproof seal as well as for locking bolts 129 and 130 securely in place. The rim of the sealing piece provides an even cushion which insulates the heads of bolts 129 and 130 from engagement with material 132. This construction is of importance in constructing buildings from corrugated sheets of metal, while maintaining an airtight and watertight condition.

It will be understood that the thin-wall device forming or from which is formed the sealing piece of the present invention may vary in size, thickness and length according to the purpose for which it is intended. Its inner diameter is advantageously made so that it rests rather tightly against the fastener so that when disposed on the fastener it will not be displaced even with rough, high speed handling. The short, thin sleeve of plastic material is usually disposed on the fastener near its head and is of such length so that there is sufficient material to produce a washer of desired size and thickness under the compressive force resulting from securing the fastener in place. If desired, the device could be positioned within the nut. In practice when used with screw sizes 1–3, the sleeve has a wall thickness within the range .010 inch–.015 inch; with screw sizes 4–6, a wall thickness within the range .010 inch–.017 inch; with screw sizes 8–12, a wall thickness within the range .010 inch–.022 inch; with screw sizes ¼-inch–⅜-inch, a wall thickness within the range .015 inch–.025 inch; and with screw sizes ⁷⁄₁₆-inch–¾-inch, wall thickness within the range .022 inch–.032 inch.

In certain applications, such as with threaded fastening devices, a partial cylinder may be used, such as horseshoe shaped, since the engagement of the mating threads permanently distorts the plastic sleeve or body of the device and spreads the plastic material about the periphery of the threaded portion in a thin layer of material filling the clearance space between the threads of the members providing an effective seal and lock.

The nylon sleeve positioned on the fastener may be of sufficient length to extend into part or all of the fastener opening or recess into which the fastener extends. If a sleeve is used long enough to extend from the fastener head to the nut or other structure before tightening, then as the nut is drawn up, pressure on the sleeve causes the nylon to cold flow around all parts of the joint, forming washerlike discs at both ends and filling all spaces between the bolt and the neck. However, the sealing device of the present invention does not necessarily have to extend into the opening through which the fastener passes but may be located as a closely conformed washer entirely between the head of the fastener and the object that is to be fastened. Even though the washer may have no integral extensions surrounding the fastener in the opening, the controlled permanent distortion or deformation of the nylon in its cold state forces the plastic material into tight and intimate contact with the fastener and into any space available between the fastener and the opening. Thus an efficient, effective and resilient washer and lock is formed between the head of the fastener and the article to be fastened which provides a vibrationproof, waterproof seal. A similar washer may be formed under the nut or other structure cooperating with the fastener to retain the article being fastened.

The present invention is particularly useful where the fastener does not conform closely to the shape of the aperture in the object being fastened, such as due to error in fabrication or too wide tolerances. In such a case, the present sealing piece serves to fill up all voids and provides a rigid fastener despite such lack of conformation.

The present invention can be used to hold together various materials including plates or layers of metal, wood, plastic materials, glass, etc., and it may be used with particular advantage for relatively small fasteners which hold together layers of thin sheet metal or other thin materials where the extra cushioning of the resilient washer distributes the load over a larger area so that stress concentrations are avoided.

The sealing pieces of the present invention may be fabricated into their required shapes in a variety of ways. The form of FIGURE 1 may be readily made by cutting suitable lengths from an extended tube. The forms of FIGURES 2 and 3 may be fabricated by pressing, rolling or molding. Those of FIGURES 4 and 5 may be formed by molding or pressing. Those of FIGURES 7 and 8 may be best made by cold flowing the rim of a tube back on itself, as by an axially moving die. If desired, of course, any of the sealing pieces described herein could be individually molded to the required shape.

The push-down corrugated insulated sleeve 43 shown in FIGURE 6 is advantageously made in the die assembly 140 shown in FIGURE 21. Die assembly 140 has an upper or male hollow die 142 having a sleeve 144 depending therefrom and having a bore 146 therein. Slidably inserted in bore 146 of male member 142 is a pin or cylindrical member 148. Pin 148 is advantageously slightly smaller in diameter than the inner diameter of the tube or sleeve to be used. Fixedly mounted on pin 148 is a boss 150 which normally bears against the lower end of die member 142 by reason of a helical spring 152 which bears against the upper surface of boss 150 and the upper end of member 142. If desired plate 153 may be secured to the upper portion of die member 142 for securing spring 152. Die assembly 140 has a lower or female die member 155 having a recess 157 for receiving the lower end of pin 148. Recess 157 is slightly larger than the outer diameter of the tube or sleeve 159 axially disposed therein. Recess 157 has a slightly larger recess 161 adjacent the mouth opening. Communicating with recess 157 is an axial passage 163 through which a rod 165 is slidably mounted. Rod 165 has an enlarged head 167 contiguous to the lower part of recess 157 for aiding in removing the tube from female die 155 after compression, in a manner to be described. With a nylon tube 159 in position in female die 155, as shown in FIGURE 21, the upper die member 142 is lowered and pin 148 is slidably received with the bore of nylon tube 159 for supporting it, as shown. Upon the continued lowering of male die 142, the lower surface of depending sleeve 144 contacts the upper surface of nylon tube 159 thereby compressing tube 159 longitudinally. During this compression tube 159 is internally supported by pin 148. The outer surface of nylon tube 159 is confined by the walls of recess 161 while tube 159 is being subjected to longitudinal compression, causing an overlapped corrugation 45, such as illustrated in FIGURE 6. Thus, the confining of the upper portion of tube 159 against further lateral cold flow forces the tube 159 into the overlapping corrugated structure such as indicated in FIGURE 6. If desired a plurality of such overlapped corrugations can be obtained by continuing the longitudinal compression of tube 159. After upper die member 142 is removed, rod 165 is pushed upwardly for aiding in removing tube 159 from recess 157 and the cycle is repeated.

When the tube or sleeve having one or more multiple thickness corrugations, washers or projections at one end is used with a fastening means such as a bolt, stud, screw, rivet, nail or the like, in a recess large enough to permit the sleeve to extend into the recess, upon tightening the fastening means (as by driving a nail or screw, or screwing on a nut or the like), the material of the sealing piece is pressed inwardly against and adheres to the shank of the fastener and outwardly against the walls of the recess for forming a sealing structure which securely surrounds and locks the fastening means in the recess and gives a vibrationproof sealed structure. The projections or flanges on the end of the sealing piece are then locked under the head of the fastener, with the cylindrical portion of the sleeve extending through the opening or openings. This assures the formation of an integral washer between the head of the fastener and the piece being fastened, when tightened in place, and insures that the cylindrical portion provides a tight vibrationproof, leakproof structure over wide temperature and pressure ranges, and also insulates the fastener from the object being fastened to prevent corrosion, such as from electrolytic action caused by two dissimilar metals in contact with each other or with any type of corrosive atmosphere.

The sealing structures in accordance with the present invention can be made in various sizes, thicknesses, lengths and segments of cylinders and may be combined with a fastener and sold therewith or may be sold separately and combined with fastener at the time of use. Advantageously, when used with the fastener, the plastic sleeve or tube will have some means for avoiding accidental displacement before use and when applied, such as an internal diameter approximating that of the fastener on which is to be used to obtain a snug fit. The multiple-wall lateral projection on the tube or sleeve (as in FIGURES 2, 3, 6 to 8) on the projections of FIGURES 4 and 5 will ordinarily be located adjacent and under the head of the fastener, and the length of the portion of the sleeve can be selected, dependent upon the length of the fastener and the extent to which it is desired to have the plastic cylindrical portion extend into or through the opening. As mentioned above, the sleeves used with fasteners are of special value for securing together thin sheetings which are difficult to secure in a vibrationproof manner or to provide hermetic sealed relations. The controlled flow of the plastic around the fastener shank and between the outer holes and the fastener head and the nut (or securing structure) and gives a particularly valuable vibrationproof arrangement.

The sealing pieces of the present invention are relatively inexpensive to produce, and easy to use and thus can be used in low cost mass produced products where cost is important as well as in costly items such as buildings or machinery where effective results are the primary characteristic desired. In both cases the present invention has been widely accepted and used.

The seal obtained is of permanent shape allowing the fastener to be removed and replaced many times with substantially identical results as when originally sealed in place.

Also, the lack of abrasive characteristics of the sleeve reduces the work required to tighten the fastener, making the assembly easy to use and reduce the wear on the threads.

While the sealing devices shown in FIGURES 7, 8, 12, 13 are illustratively shown with the walls of the flanges spaced apart, the flange walls may be abutting.

It will be evident that fasteners of different sizes and shapes can be used and provided with a nylon or plastic sleeve of varying length, thickness and circular cross section and that the fasteners disclosed can be used in holes of varying sizes and for securing various articles together in a vibrationproof and hermetically sealed manner. The new fastener arrangements of the present invention are accordingly applicable for various purposes where it is important to prevent or reduce vibration, reduce weight and yet provide a strong vibrationproof, corrosion resistant seal, such as in airplanes or other transportation construction or other machinery.

Since many variations of the aforegoing described device can be readily devised without departing from the spirit of the present invention it is to be understood that this description is illustrative only and is not to be construed in a limiting sense, the present invention being defined solely by the appended claims.

What is claimed is:

1. A fastener with a shank and a head and having frictionally mounted on said shank adjacent said head a preformed, thin walled device made of a plastic material having substantially the cold-flow, memory and physical characteristics of FM-10001 nylon, the end of said device adjacent said fastener head being rolled over on itself with the transverse edge of said end being contiguous to the wall of said device intermediate of its ends for forming a double thickness annular flange along a plane parallel to the longitudinal axis of said fastener shank, said double thickness of flange being separated, said flange being permanently extrudable in place toward said body portion to form a custom-fitted, permanently fluid-tight seal with said fastener in response to said fastener being operatively actuated.

2. A sealing piece for use with a fastener assembly comprising a self-supporting tubular body portion of cold-flowable, rigid synthetic plastic material, one end of said body portion being rolled over on itself so that the outer circumferential edge of said one end is contiguous to said body portion intermediate of the ends of said piece for forming a double thickness annular flange along a plane parallel to the longitudinal axis of said body portion, said double thickness of said flange being spaced apart, said flange being permanently extrudable in place toward said body portion to form a custom fitted permanent seal with said fastener assembly in response to assembling said fastener assembly, said rolled over edge of said one end flowing towards said body portion to form a fluid tight seal.

3. A sealing piece for use with a fastener, comprising a self-supporting tubular body portion of cold-flowable rigid synthetic plastic material, one end of said body portion being rolled over on itself and contiguous to said body portion, so that the outer circumferential edge of said one end is closer to said body portion than the inner circumferential edge for forming a double thickness annular flange closer to one end of the sealing piece, said double thickness lying in a plane parallel to the longitudinal axis of said body portion, said flange having a portion with an outer diameter larger than the outer diameter of the end contiguous to said body portion and capable of being permanently extrudable in place toward said body portion to form a custom-fitted permanent seal with said fastener in response to tightening said fastener, said rolled over edge flowing toward said body portion to form a fluid-tight seal.

4. A fastener assembly comprising a fastener having a shank with a head at one end, and a preformed thin-walled sealing element made of cold-flowable rigid synthetic plastic material snugly mounted on said shank adjacent said head, the end of said element facing said fastener head being rolled over on itself and contiguous to said wall, so that the outer circumferential edge of said end is closer to the wall of said element than the inner circumferential edge for forming a double thickness annular flange adjacent said fastener head, said double thickness lying in a plane parallel to the longitudinal axis of said fastener shank, said flange having a portion with an outer diameter greater than the diameter of the end contiguous to said wall and capable of being permanently extrudable in place toward said wall to form a custom-fitted seal with said fastener in response to said fastener being operatively tightened.

5. A fastener assembly as set forth in claim 4 with said flange having an outer diameter when compressed in fastening relation greater than the outer diameter of said head to provide an overhang about said head.

6. A fastener assembly as set forth in claim 4, further including a receiving member operatively cooperating with said fastener shank, said element being permanently deformed and flowing into any clearance space between said receiving member and said shank adjacent said head in response to and forming a washer surrounding said shank between said head and said receiving member in response to said fastener being operatively actuated.

7. A sealing piece in accordance with claim 6 wherein said rigid plastic material has essentially the cold flow, memory and physical characteristics of FM–10001 nylon.

8. A sealing element for use with a fastener having an enlarged and a shank portion insertable in a receiving member and capable of being retained in assembled relation therewith, said sealing element comprising a hollow body of tough, cold-flowable plastic material, said body having an opening therethrough dimensioned to snugly receive the shank portion of said fastener, and a double thickness flange annularly disposed adjacent one end of said body and having one end of said flange integrally connected to one end of said body and the other end of said flange disposed adjacent to said body, said flange having an outer peripheral surface substantially convex in shape and further having a volume at least as great as the volume of the clearance space between the shank portion of said fastener adjacent said head and the receiving member when assembled, said flange being permanently deformable and cold-flowable under the application of tightening pressure between said fastener and said receiving member to cause said flange to cold flow to completely fill said space and sealingly engage the periphery of said shank portion to provide a seal between said fastener and said receiving member.

9. A sealing element as set forth in claim 8, wherein said one end of said body is rolled over on itself forming said double thickness flange.

10. A sealing element as set forth in claim 8, wherein said double thickness flange is outwardly directed.

11. A sealing element as set forth in claim 8, wherein said receiving member is an apertured work-piece and said fastener mates with a cooperating member, said body being dimensioned to be slidably received within the aperture in said work-piece having a length greater than the thickness of said work-piece, so that the ends of said element extend beyond the surfaces of said work-piece, said flange having an outer diameter greater than the diameter of said aperture.

12. A sealing element as set forth in claim 8, wherein said shank portion is threaded along the portion receiving and supporting said sealing element, said flange under the application of said tightening pressure cold-flowing further to fill the space between adjacent threads of said threaded shank portion.

References Cited by the Examiner
UNITED STATES PATENTS

| | | | |
|---|---|---|---|
| 391,883 | 10/1888 | Cottle | 59—79 |
| 412,389 | 10/1889 | Isherwood | 72—370 |
| 2,299,542 | 10/1942 | Hedfield | 72—302 |
| 2,326,455 | 8/1943 | Gray. | |
| 2,507,638 | 5/1950 | Leahy | 29—205 |
| 2,723,048 | 11/1955 | Welch. | |
| 2,724,303 | 11/1955 | Holcomb | 85—50 |

CARL W. TOMLIN, *Primary Examiner.*

M. PARSONS, JR., *Assistant Examiner.*